United States Patent
Gutierrez et al.

(10) Patent No.: US 12,465,023 B1
(45) Date of Patent: Nov. 11, 2025

(54) LEASH RELEASE MECHANISM

(71) Applicant: Giselle Gutierrez, Miami, FL (US)

(72) Inventors: Giselle Gutierrez, Miami, FL (US);
Jose Antonio Castellanos, Miami Lakes, FL (US); Jefferson Steveen Roquemen Clavijo, Antioquia (CO)

( * ) Notice: Subject to any disclaimer, the term of this patent is extended or adjusted under 35 U.S.C. 154(b) by 0 days.

(21) Appl. No.: 18/941,052

(22) Filed: Nov. 8, 2024

Related U.S. Application Data

(63) Continuation-in-part of application No. 17/970,467, filed on Oct. 20, 2022, now abandoned.

(51) Int. Cl.
*A01K 27/00* (2006.01)

(52) U.S. Cl.
CPC .......... *A01K 27/003* (2013.01); *A01K 27/004* (2013.01)

(58) Field of Classification Search
CPC .... A01K 27/00; A01K 27/003; A01K 27/004; A01K 27/005; B65H 35/00; B65H 35/0006
USPC ......................................... 119/772, 774, 776
See application file for complete search history.

(56) References Cited

FOREIGN PATENT DOCUMENTS

| CN | 203205260 U | * | 9/2013 |
| CN | 209572805 U | * | 11/2019 |
| EP | 0970606 A1 | * | 1/2000 |
| ES | 1204714 U | * | 2/2018 |

* cited by examiner

*Primary Examiner* — Troy Chambers
*Assistant Examiner* — Brook Victoria Schmid
(74) *Attorney, Agent, or Firm* — Sanchelima & Associates, P.A.; Jesus Sanchelima; Christian Sanchelima

(57) ABSTRACT

A leash release mechanism includes a housing assembly and a leash cutting assembly. The housing assembly has a housing with a handle. The leash cutting assembly is housed by the housing. The leash cutting assembly includes a pin lock, a cutting board and a spring-loaded mechanism. The spring-loaded mechanism includes a button and at least one spring mechanically connected to a hammer with a blade. The pin lock is configured to block the spring-loaded mechanism. The spring-loaded mechanism releases the hammer when the pin lock is removed from the leash cutting assembly and when the button is pressed. The at least one spring drives the hammer with the blade to cut a leash in the cutting board.

10 Claims, 5 Drawing Sheets

LEASH RELEASE MECHANISM

OTHER RELATED APPLICATIONS

The present application is a continuation-in-part of pending U.S. patent application Ser. No. 17/970,467, filed on Oct. 20, 2022, which is hereby incorporated by reference

BACKGROUND OF THE INVENTION

Field of the Invention

The present invention relates to a release mechanism and, more particularly, to a leash release mechanism that includes a housing containing a leash and a cutting mechanism to cut release the leash.

Description of the Related Art

Several designs for dog leash have been designed in the past. None of them, however, include a leash release mechanism with a spring-loaded cutting mechanism including a blade member attached to a hammer that when released is pushed by springs towards a cutting board to cut the leash.

Applicant believes that a related reference is Li, which corresponds to patent No. CN 203205260 issued for an emergency button, wherein said button has a removably attached secure pin, that when removed permits said button to be actuated. Applicant believes that another related reference is Shi, which corresponds to patent No. CN 209572805 issued for a kind of automatic retract pet tractor with a push button located on the interior side of a handle that, when pressed, actuates a complex mechanism using transmission shafts to cut the traction rope. The cutting action occurs in a separate section of the housing, specifically the traction rope recovery tank, rather than at the location of the push button. In contrast, the present invention incorporates a more efficient and compact design where the entire cutting mechanism is localized in the same portion relative to the housing. Moreover, none of these references, however, teach of a leash release mechanism that includes a spring-loaded cutting mechanism to cut the leash when a securing pin lock is removed from the mechanism and an action button is pressed.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a leash release mechanism that includes a housing containing a leash and a leash cutting mechanism to release the leash.

It is another object of this invention to provide a leash release mechanism with a spring-loaded cutting mechanism to easily cut the leash when the button is pressed.

It is still another object of the present invention to provide a leash release mechanism that includes a blade to cut the leash.

It is yet another object of the present invention to provide a leash release mechanism with a pin lock to block the cutting mechanism.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
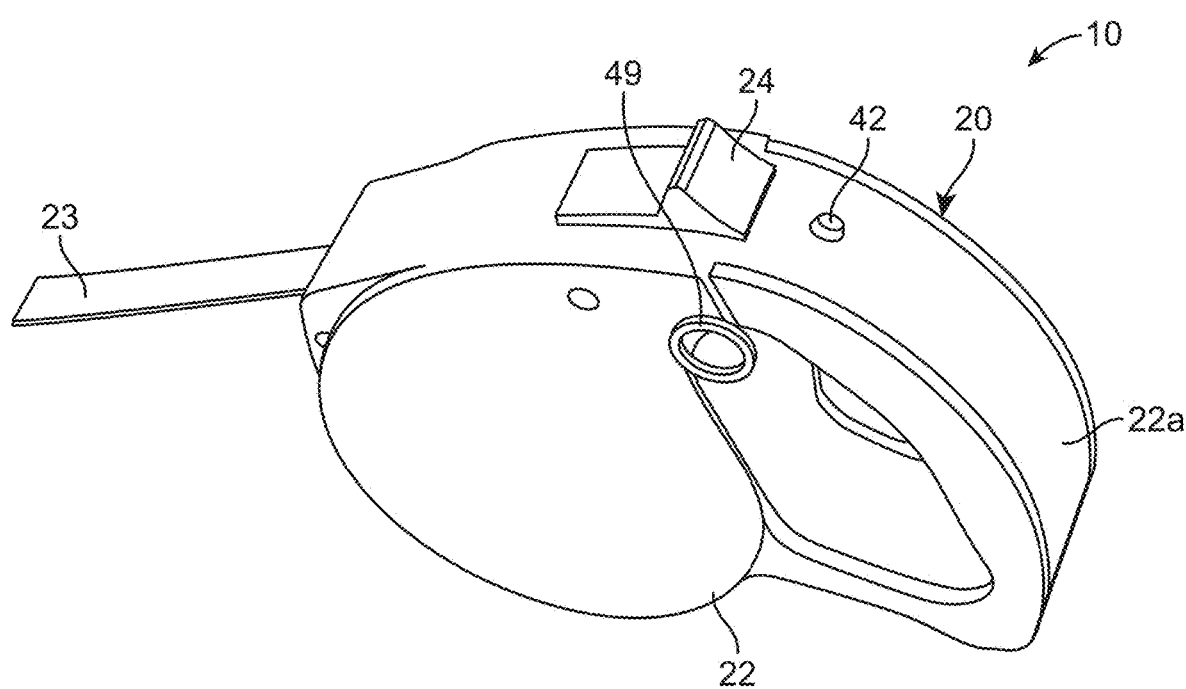
FIG. 1 represents an isometric view of one of the preferred embodiments of the present invention 10 showing the housing assembly 20 of the leash release mechanism.

Referring now to the drawings, where the present invention is generally referred to with numeral 10, it can be observed that it basically includes a housing assembly 20 and a leash cutting assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The housing assembly 20 may include a housing 22 with a handle 22a. The housing 22 may be a housing for a winding mechanism 30 with a leash 23 rolled to the winding mechanism 30. The housing 22 may have an outlet to allow the leash 23 to go therethrough. The housing 22 may be made of a sturdy and resistant material such as but not limited to aluminum, metal, polymers, or any other suitable material. The handle 22a may be disposed at a rear end of the housing 22. The housing 22 may have any suitable shape for e leash housing. The housing assembly 20 may also include a lock lever 24. The lock lever 24 may be embedded to the housing 22. The lock lever 24 may be operatively connected to the leash 23 to permit more leash 23 to be expedited from the outlet of the housing 22 or to stop the leash 23 from coming out of the housing 22. The lock lever 24 may be disposed at a top portion of the housing 22 in order to permit a user to easily operate the lock lever 24 with a thumb.

The leash cutting assembly 40 may be enclosed inside the housing 22. The leash cutting assembly 40 basically includes a button 42, a stop portion 43b, a hammer 46, a blade 47 and returning spring 44a and trigger springs 46a, defining a spring loaded cutting mechanism. The button 42 is a cylindrical member that protrudes outwardly from a top surface of the housing 22.

The button 42 may be connected to a trigger member 43a with a bar member 43 and a stop portion 43b. The bar member 43 may be a horizontal bar with the button 42 perpendicularly attached thereto as observed in FIG. 2. A central bottom portion of the bar member 43 may have the trigger member 43a connected thereto. The trigger member 43a may be perpendicular to the bar member 43. The trigger member 43a may have a top portion with a rectangular shape and a bottom portion with a smaller width.

The stop portion 43b may be located on a lower end of the trigger member 43a. The stop portion 43b may have a notch portion that protrudes laterally as observed in FIG. 4. The stop portion 43b may allow to hold the hammer 46 in a predetermined position. The stop portion 43b may release the hammer 46 when the button 42 is pressed. A top portion of the trigger member 43a may have a hole crossing an entire width thereof. The hole may receive the pin member 49 thereacross. The hole may preferably have a circular shape.

The pin member 49 may be an elongated cylindrical rod with a ring attached to a first end thereof. The ring may be used by the user to facilitate the removal or insertion of the pin member 49. The pin member 49 may be inserted into the hole to block the trigger member 43a to prevent the activation of the spring loaded mechanism. The leash cutting assembly 40 may further include a support member 44. The support member 44 may be affixed to the interior of the housing 22. The bar member 43 may have the returning spring 44a attached to a bottom portion thereof as observed in FIG. 2. A top end of the returning spring 44a may be attached to a top portion of the support member 44. The returning spring 44a be compressed when the button 42 is pressed. The returning spring 44a may allow the button 42 to return to a start position when the button 42 is released. The support member 44 has a bottom portion with a surface with an inclination respect to the top surface of the support member 44.

Figure 2:
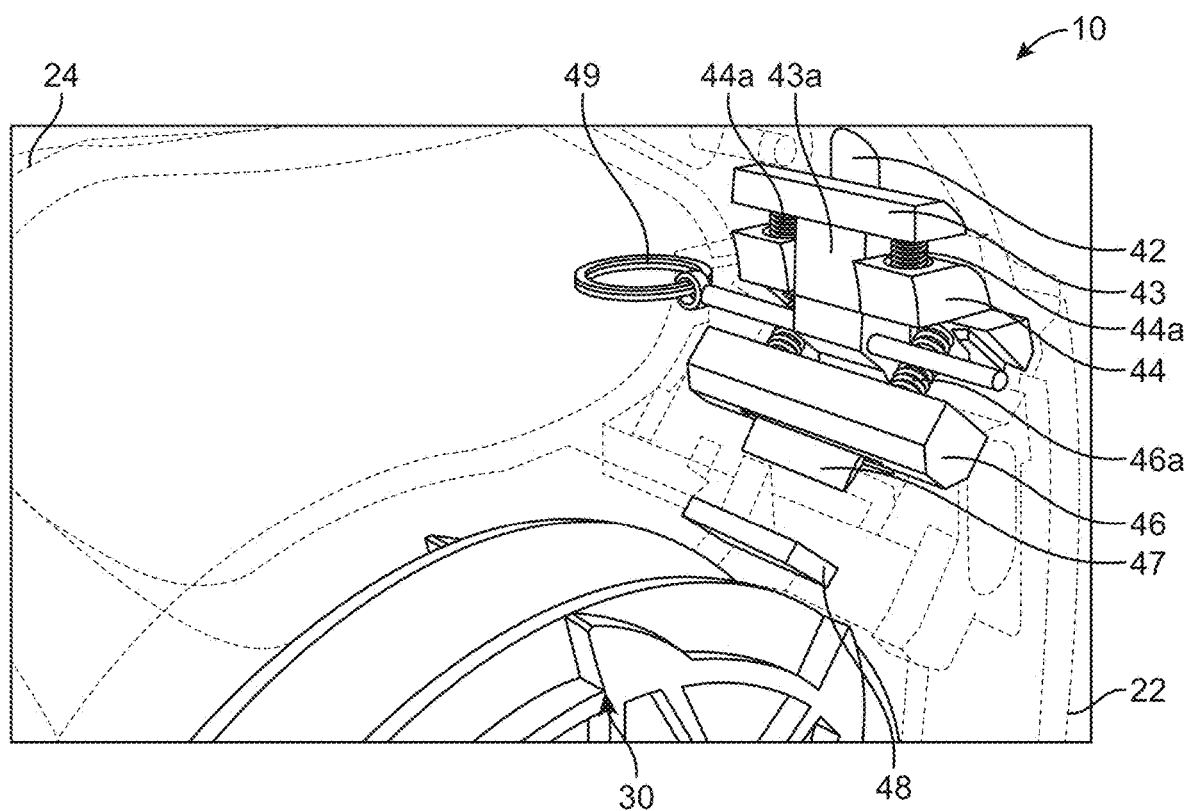
FIG. 2 shows a see-through view of the present invention showing the leash cutting assembly 40.
Figure 3:
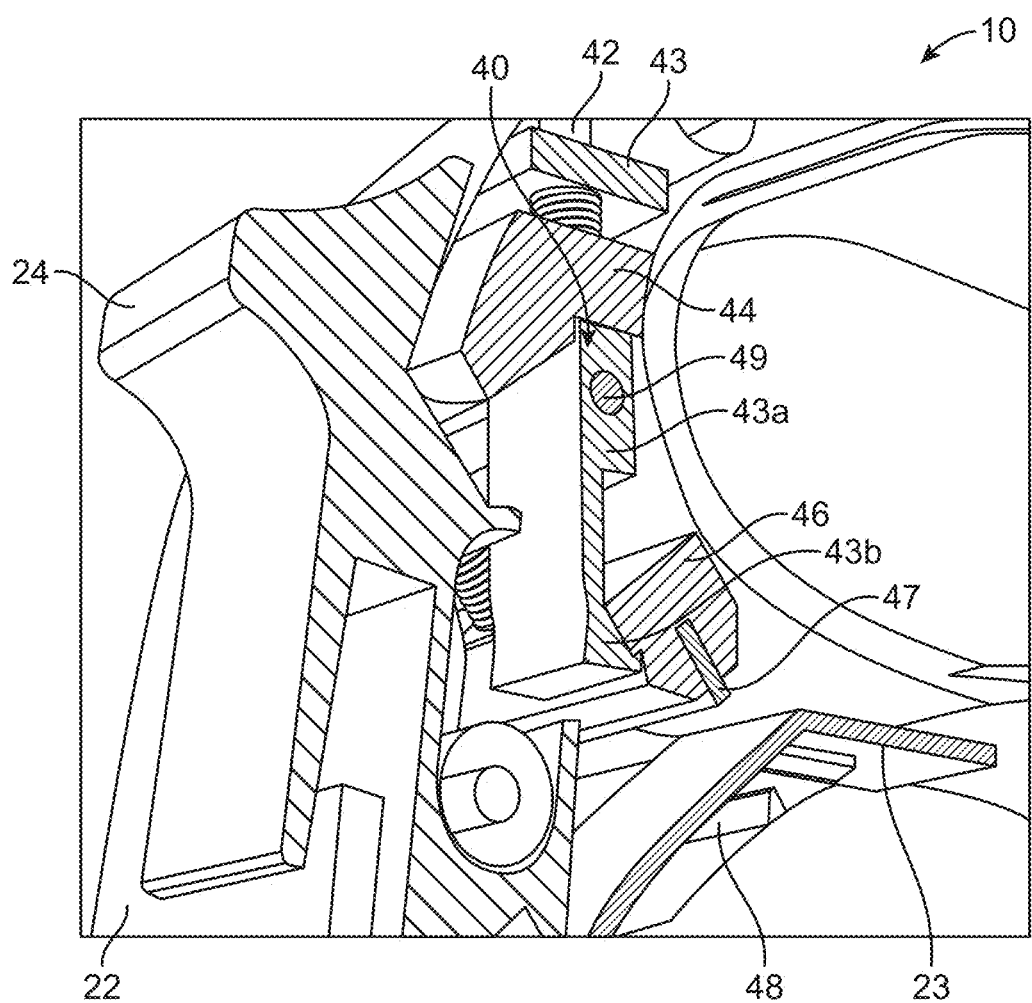
FIG. 3 illustrates a cross-section view of the present invention 10 showing the leash cutting assembly 40 including the stop portion 43b holding the hammer 46.
Figure 3A:
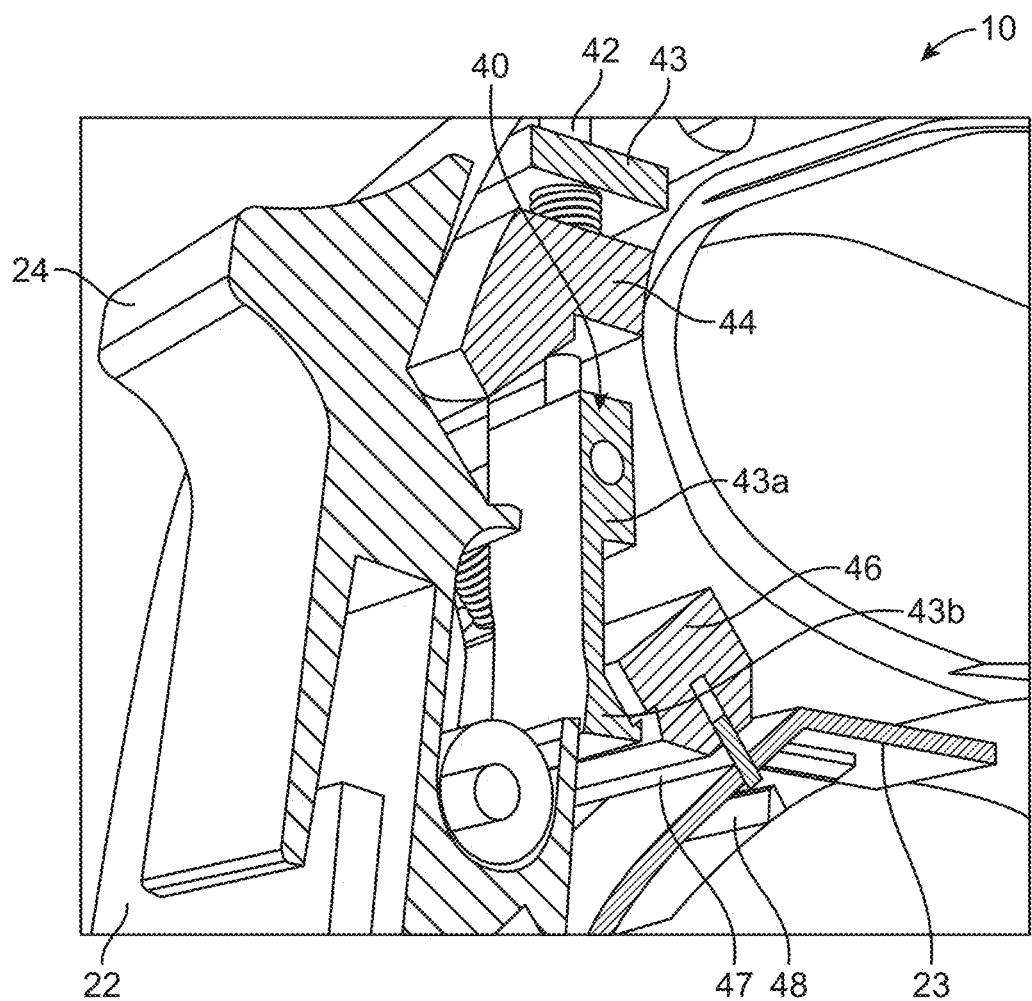
FIG. 3A is a cross-sectional view of the present invention 10 showing the blade 47 in a cutting configuration cutting the leash 23.
Figure 4:
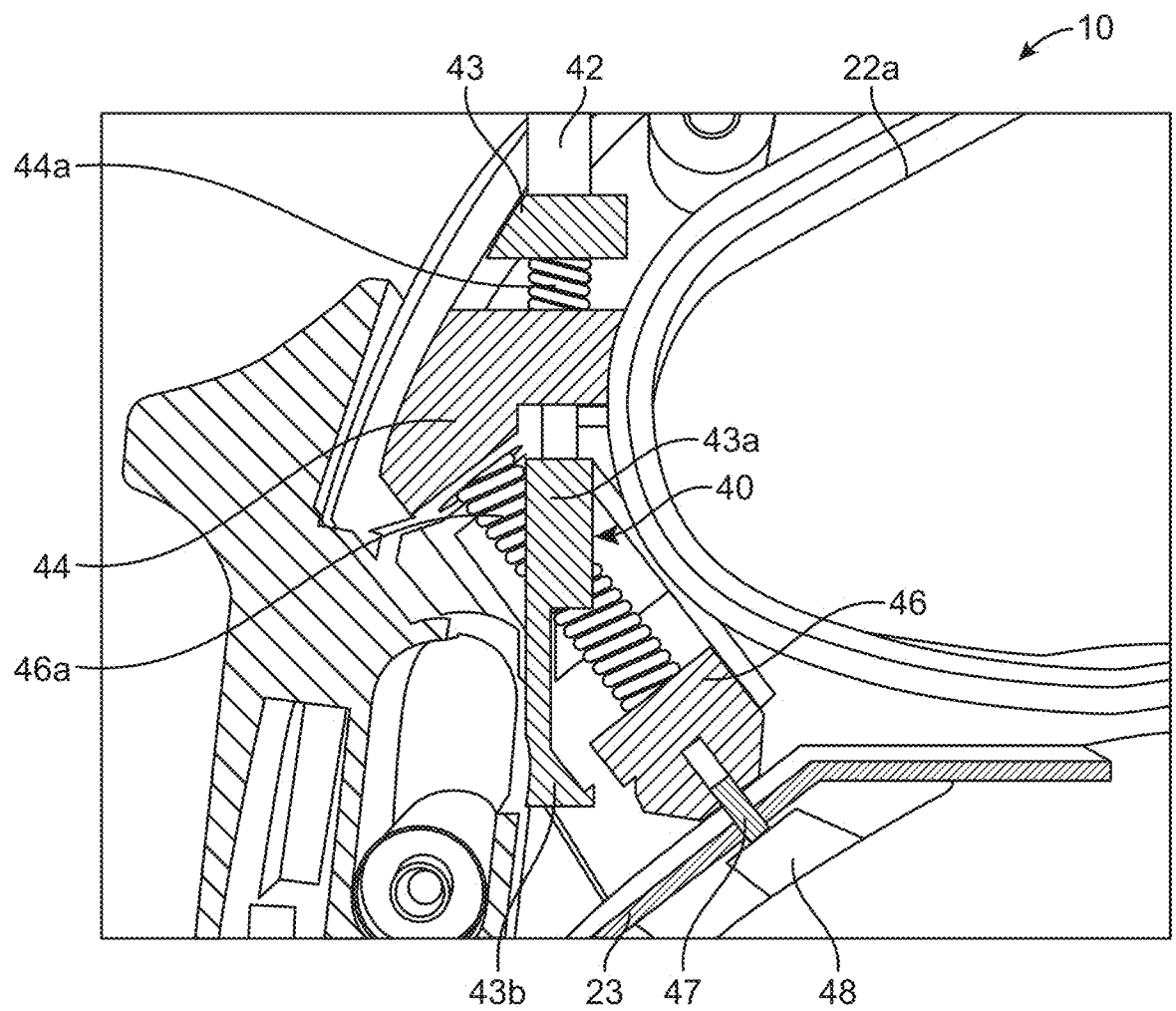
FIG. 4 is a representation of a cross-section view of the present invention 10 showing the blade 47 cutting the leash 23.

The bottom inclined portion of the support member 44 may have the trigger springs 46a attached thereto as observed in FIG. 4 and FIG. 2. A bottom end of the trigger springs 46a may be attached to a top surface of the hammer 46. The trigger springs 46a may be compressed for an initial position of the hammer 46. The hammer 46 may have a cut that allows the notch of the stop portion 43b to fit therein. The hammer 46 may have a slit to receive the blade 47 therein to cut a leash 23. The stop portion 43b may hold the hammer 46 in the initial position. The hammer 46 may be released by the trigger member 43a when the button 42 is pressed. The trigger springs 46a may push the hammer 46 towards the cutting board 48 to cut a leash 23 with the blade 47. The cutting board 48 may be rectangular cutting board embedded inside the housing 22. The cutting board 48 may be a board to cut the leash 23 thereto using the blade 47. The pin member 49 may lock the bar member 43 to prevent the release of the hammer 46 thus prevent accidental cutting the leash 23. The pin member 49 needs to be removed from the hole of the support member 44 to allow pressing the button 42 to permit the stop portion 43b releasing the hammer 46 to cut the leash 23 with the blade 47.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A leash release mechanism, comprising:
   a housing assembly including a housing; and
   a leash cutting assembly enclosed by the housing, said leash cutting assembly includes a pin lock and a spring-loaded mechanism including a button and at least one spring mechanically connected to a hammer with a blade; wherein the pin lock is configured to block the spring-loaded mechanism; and wherein the leash release mechanism is configured such that the spring-loaded mechanism releases the hammer when the pin lock is removed from the leash cutting assembly and, when the button is pressed, the at least one spring drives the hammer to cut a leash; wherein the spring-loaded mechanism further includes a bar member connected to the button; wherein the bar member is connected to a trigger member; wherein the trigger member includes a hole for receiving the pin lock, wherein the pin lock is an elongated cylindrical rod with a ring attached to a first end thereof.

2. The leash release mechanism of claim 1, wherein the leash cutting assembly further includes a cutting board.

3. The leash release mechanism of claim 2, wherein the hammer is configured to push the blade towards the cutting board to cut the leash.

4. The leash release mechanism of claim 1, wherein the trigger member includes a stop portion configured to hold the hammer in a predetermined position, wherein the stop portion includes a notch portion.

5. The leash release mechanism of claim 1, wherein the leash cutting assembly further includes a support member affixed to an interior of the housing.

6. The leash release mechanism of claim 1, wherein the leash cutting assembly further includes a returning spring, wherein the returning spring is configured to return the button to a start position when the button is released.

7. The leash release mechanism of claim 1, wherein the at least one spring is a trigger spring, said trigger spring is in a compressed state when the hammer is in an initial position, wherein said trigger spring is configured to push the hammer when the button is pressed, releasing the hammer.

8. The leash release mechanism of claim 1, wherein the pin lock is removable to enable activation of the spring-loaded mechanism.

9. A leash release mechanism, comprising:
   a housing assembly including a housing and a leash; and
   a leash cutting assembly enclosed within the housing, said leash cutting assembly includes a button, a bar member, a trigger member, a support member, a hammer, a blade, a returning spring, at least one trigger spring, a cutting board, and a removable pin lock; wherein the button protrudes outwardly from a top surface of the housing, the bar member is connected to the button, the trigger member is connected to the bar member and includes a stop portion with a notch, and a hole for receiving the pin lock; wherein the support member is affixed to an interior of the housing and includes an inclined bottom portion; wherein the hammer includes a cut configured to receive the notch of the stop portion; wherein the hammer has a slit for receiving the blade, the blade being positioned within the slit of the hammer; wherein the returning spring is connected between the bar member and the support member; wherein the at least one trigger spring is connected between the inclined bottom portion of the support member and the hammer; wherein the cutting board is positioned opposite the hammer, the pin lock is configured to be removably inserted through the hole of the trigger member to selectively block movement of the trigger member; wherein the leash release mechanism is configured such that, upon removal of the pin lock and depression of the button, the returning spring is compressed, the stop portion releases the hammer and the at least one trigger spring drives the hammer and blade towards the cutting board to cut the leash.

10. A leash release mechanism, consisting of:
a housing assembly including a housing and a leash; and
a leash cutting assembly enclosed within the housing, said leash cutting assembly includes a button, a bar member, a trigger member, a support member, a hammer, a blade, a returning spring, at least one trigger spring, a cutting board, and a removable pin lock; wherein the button protrudes outwardly from a top surface of the housing, the bar member is connected to the button, the trigger member is connected to the bar member and includes a stop portion with a notch, and a hole for receiving the pin lock; wherein the support member is affixed to an interior of the housing and includes an inclined bottom portion; wherein the hammer includes a cut configured to receive the notch of the stop portion; wherein the hammer has a slit for receiving the blade, the blade being positioned within the slit of the hammer, the returning spring is connected between the bar member and the support member; wherein the at least one trigger spring is connected between the inclined bottom portion of the support member and the hammer; wherein the cutting board is positioned opposite the hammer, the pin lock is configured to be removably inserted through the hole of the trigger member to selectively block movement of the trigger member; wherein the leash release mechanism is configured such that, upon removal of the pin lock and depression of the button the returning spring is compressed, the stop portion releases the hammer and the at least one trigger spring drives the hammer and blade towards the cutting board to cut the leash.

* * * * *